(12) United States Patent
Sun et al.

(10) Patent No.: US 12,097,896 B2
(45) Date of Patent: Sep. 24, 2024

(54) STROLLER

(71) Applicant: Wonderland Switzerland AG, Steinhausen (CH)

(72) Inventors: Mingxing Sun, Guangdong (CN); Shoufeng Hu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/799,922

(22) PCT Filed: Feb. 9, 2021

(86) PCT No.: PCT/EP2021/053013
§ 371 (c)(1),
(2) Date: Aug. 15, 2022

(87) PCT Pub. No.: WO2021/160578
PCT Pub. Date: Aug. 19, 2021

(65) Prior Publication Data
US 2023/0069631 A1 Mar. 2, 2023

(30) Foreign Application Priority Data
Feb. 16, 2020 (CN) .......................... 202020173724.7

(51) Int. Cl.
*B62B 9/12* (2006.01)
*B62B 9/24* (2006.01)
*B62B 9/26* (2006.01)

(52) U.S. Cl.
CPC ............... *B62B 9/12* (2013.01); *B62B 9/245* (2013.01); *B62B 9/26* (2013.01); *B62B 2202/023* (2013.01)

(58) Field of Classification Search
CPC . B62B 3/1468; B62B 2202/023; B62B 9/245; B62B 9/26; A47D 1/0085
See application file for complete search history.

(56) References Cited

U.S. PATENT DOCUMENTS 2,875,815 A * 3/1959 Gill ........................... B62B 9/26
292/254
4,174,866 A * 11/1979 Rhyan .................. A61G 5/1094
248/210

(Continued)

FOREIGN PATENT DOCUMENTS

CN 203032731 U 7/2013
CN 103371670 A 10/2013

(Continued)

OTHER PUBLICATIONS

Silver cross dune/reef snack tray; Little Folks NYC; https://littlefolksnyc.com/products/silver-cross-dune-reef-snack-tray; printed Sep. 22, 2023.*

(Continued)

*Primary Examiner* — Emma K Frick
(74) *Attorney, Agent, or Firm* — Winston Hsu

(57) ABSTRACT

A stroller (100) includes a frame (1), a handrail (2) and a dinner plate (3). The handrail (2) is installed on the frame (1) and located in front of the frame (1), and the dinner plate (3) is detachably connected with the handrail (2). With detachable connection of the dinner plate (3) and the handrail (2), the dinner plate (3) and the handrail (2) can work independently or together. When the dinner plate (3) is connected to the handrail (2), the stroller (100) has safety and feeding convenience. When the dinner plate (3) is removed from the handrail (2), the handrail (2) still can work, thus ensuring the safety of the stroller (100). It is convenient to remove the dinner plate (3) for cleaning at any time, thereby reducing difficulty of cleaning the dinner plate (3), and the replaceable dinner plate (3) can reduce maintenance cost. Therefore, the stroller (100) has the advantages of simple structure, and that the handrail (2) and the dinner plate (3) can work independently.

9 Claims, 6 Drawing Sheets

(56) References Cited

U.S. PATENT DOCUMENTS

| | | | | |
|---|---|---|---|---|
| 4,548,326 | A * | 10/1985 | Danna | A47C 7/70 108/26 |
| 4,560,128 | A * | 12/1985 | Willeby | A47G 23/0225 297/188.2 |
| 4,858,796 | A * | 8/1989 | Roth | B60N 3/002 224/482 |
| 5,458,394 | A * | 10/1995 | Nichols | B62B 9/245 297/173 |
| 5,503,297 | A * | 4/1996 | Frankel | B62B 5/06 224/558 |
| 5,695,162 | A * | 12/1997 | DiCastro | A47G 23/0225 297/188.2 |
| 5,865,412 | A * | 2/1999 | Mason | A47C 7/62 248/300 |
| 5,964,501 | A * | 10/1999 | Magnani | B62B 9/245 297/188.2 |
| 6,227,511 | B1 * | 5/2001 | De Costa | G09F 23/02 248/311.2 |
| 6,283,042 | B1 * | 9/2001 | Wargo | A47D 15/00 108/26 |
| 6,298,793 | B1 * | 10/2001 | Turner | A47D 15/00 108/26 |
| 6,467,839 | B1 * | 10/2002 | Kain | B60N 3/105 297/188.2 |
| 6,484,989 | B1 * | 11/2002 | Connery | A47D 15/00 108/26 |
| 6,746,075 | B2 * | 6/2004 | Cheng | B62B 9/245 297/149 |
| 6,799,744 | B1 * | 10/2004 | Koistinen | A01G 9/128 248/219.2 |
| 6,976,686 | B2 * | 12/2005 | Hsia | B62B 9/245 280/47.38 |
| 7,011,363 | B1 * | 3/2006 | Connery | A47D 15/00 297/148 |
| 7,043,778 | B1 * | 5/2006 | Georgitsis | A47D 7/007 211/74 |
| 8,313,114 | B1 | 11/2012 | Aron | |
| 8,382,150 | B2 * | 2/2013 | Williams | B62B 7/145 280/47.38 |
| 8,424,900 | B2 * | 4/2013 | Ryan | B62B 9/26 280/658 |
| 8,469,388 | B2 * | 6/2013 | Moore | B62B 9/245 280/650 |
| 8,777,307 | B2 * | 7/2014 | Nelson | B60N 2/24 297/188.14 |
| 9,192,246 | B2 * | 11/2015 | Chen | A47C 7/622 |
| 9,302,695 | B2 * | 4/2016 | Hartenstine | B62B 7/10 |
| 9,791,098 | B2 * | 10/2017 | Boyer | A45F 5/00 |
| 11,021,093 | B2 * | 6/2021 | Jaeckel | B60N 3/103 |
| 11,064,810 | B2 * | 7/2021 | Snir | A47C 7/622 |
| 11,547,230 | B2 * | 1/2023 | Hsu Besner | A47G 23/0225 |
| 2006/0113342 | A1 * | 6/2006 | Hampton | B62B 9/26 224/42.33 |
| 2014/0070061 | A1 * | 3/2014 | Tsai | A47D 1/008 108/25 |
| 2018/0086359 | A1 | 3/2018 | Hanson | |
| 2021/0362764 | A1 * | 11/2021 | Kim | B62B 7/105 |

FOREIGN PATENT DOCUMENTS

| | | | |
|---|---|---|---|
| CN | 205890965 U | * | 1/2017 |
| WO | 2007/033562 A1 | | 3/2007 |

OTHER PUBLICATIONS

"International Search Report" mailed on Apr. 28, 2021 for International application No. PCT/EP2021/053013, International filing date: Feb. 9, 2021.

* cited by examiner

STROLLER

CROSS REFERENCE TO RELATED APPLICATIONS

This is a 371 U.S. National Phase of International Application No. PCT/EP2021/053013, filed on Feb. 9, 2021, which claims the benefit of CN Patent Application No. 202020173724.7, and the contents of this application are incorporated herein by reference.

FIELD OF THE INVENTION

The present invention relates to a stroller according to the pre-characterizing clause of claim 1.

BACKGROUND OF THE INVENTION

With the continuous development of economy and the continuous progress of science and technology, it provides people with extremely rich consumer products for people's lives, and infant carriers, such as strollers, are ones of many consumer products. Infant carriers play an important role when caregivers take infants out. Furthermore, it can reduce the burden on caregivers and allow infants to have more comfortable postures. As people's demand for infant carriers continues to increase, the structure and technology of infant carriers are improved gradually to meet people's needs.

A conventional stroller includes a frame, a seat, and a handrail installed in the front of the frame. The Infant can ride in the seat, and the handrail can be used to ensure the infant's safety. In order to facilitate the feeding of infants, the handrail and a dinner plate have been made into an integrated structure. The dinner plate can be installed on both sides of the frame and located in the front of the frame, to achieve purposes of safety and feeding convenience. However, the above-mentioned stroller still has following drawbacks. Because the handrail and the dinner plate are integrated, it brings inconvenience in cleaning the dinner plate. In addition, when the integrated handrail and dinner plate are removed from the frame for cleaning, the stroller temporarily loses the safety of the handrail.

SUMMARY OF THE INVENTION

This is mind, the present invention aims at providing a stroller with a handrail and a dinner plate which can work independently.

This is achieved by a stroller according to claim 1. The dependent claims pertain to corresponding further developments and improvements.

As will be seen more clearly from the detail description following below, the claimed stroller includes a frame, a handrail installed on the frame and located in front of the frame, and a dinner plate detachably installed on the handrail.

According to an embodiment of the present invention, the dinner plate is installed on at least one of a front side and a rear side of the handrail.

According to an embodiment of the present invention, the dinner plate engages with the handrail in a clamping manner.

According to an embodiment of the present invention, the dinner plate comprises a dinner plate body, and an engaging component connected to the dinner plate body and for engaging with the handrail.

According to an embodiment of the present invention, the engaging component is connected to a front side, a rear side or a bottom of the dinner plate body.

According to an embodiment of the present invention, the engaging component is a resilient structure for clamping the handrail in a tight fit manner.

According to an embodiment of the present invention, the engaging component includes two clamping arms disposed opposite to each other to encircle an accommodating space with a downward opening, and the handrail passes through the accommodating space.

According to an embodiment of the present invention, the two clamping arms outwardly extend from a lateral wall of the dinner plate body and bend downwardly.

According to an embodiment of the present invention, an engaging hook is disposed on a bottom of each clamping arm and protrudes toward the accommodating space, and at least one inclined surface is formed on a bottom of the handrail to cooperate with the engaging hook.

According to an embodiment of the present invention, at least one receiving compartment with an upward opening is formed on an upper surface of the dinner plate body.

According to an embodiment of the present invention, the at least one receiving compartment is a column compartment structure.

According to an embodiment of the present invention, the dinner plate body includes a first body portion and a second body portion integrally formed with each other.

In summary, the dinner plate of the stroller of the present invention is detachably connected to the handrail, so the dinner plate and the handrail can work independently or together. When the dinner plate and the handrail are assembled with each other, the stroller has both functions of safety and feeding convenience. When the dinner plate is removed from the handrail, the handrail is installed on the frame and still can provide the protecting function, which ensures the safety of the stroller. Furthermore, the dinner plate can be detached from the handrail for cleaning, so as to reduce difficulty in cleaning the dinner plate, and the replaceable design of the dinner plate can reduce maintenance cost effectively. Therefore, the stroller of the present invention has advantages of simple structure, and that the handrail and the dinner plate can work independently.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

In the following, the invention is further illustrated by way of example, taking reference to the accompanying drawings. Thereof

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The members of the present invention can be positioned in a number of different orientations. As such, the directional terminology is used for purposes of illustration and is in no way limiting. Accordingly, the drawings and descriptions will be regarded as illustrative in nature and not as restrictive. The term "dinner plate" throughout the specification is redefined by the term "tray" conventionally known in the art.

Figure 1:
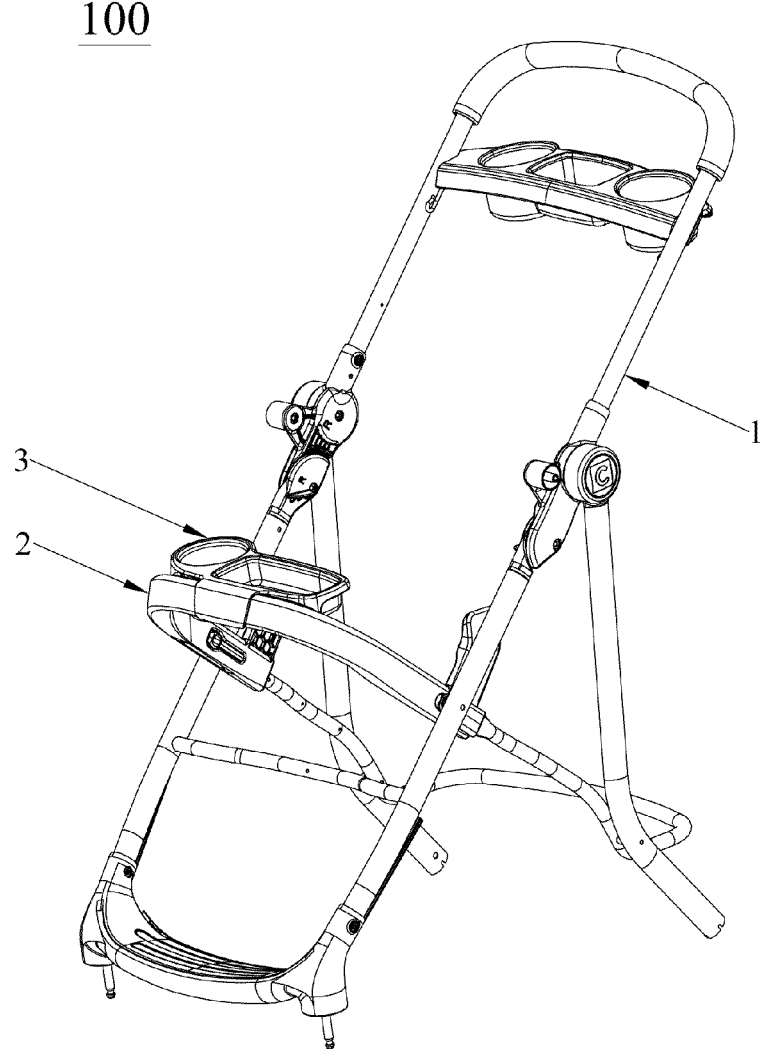
FIG. 1 is a schematic drawing of a stroller according to an embodiment of the present invention.
Figure 2:
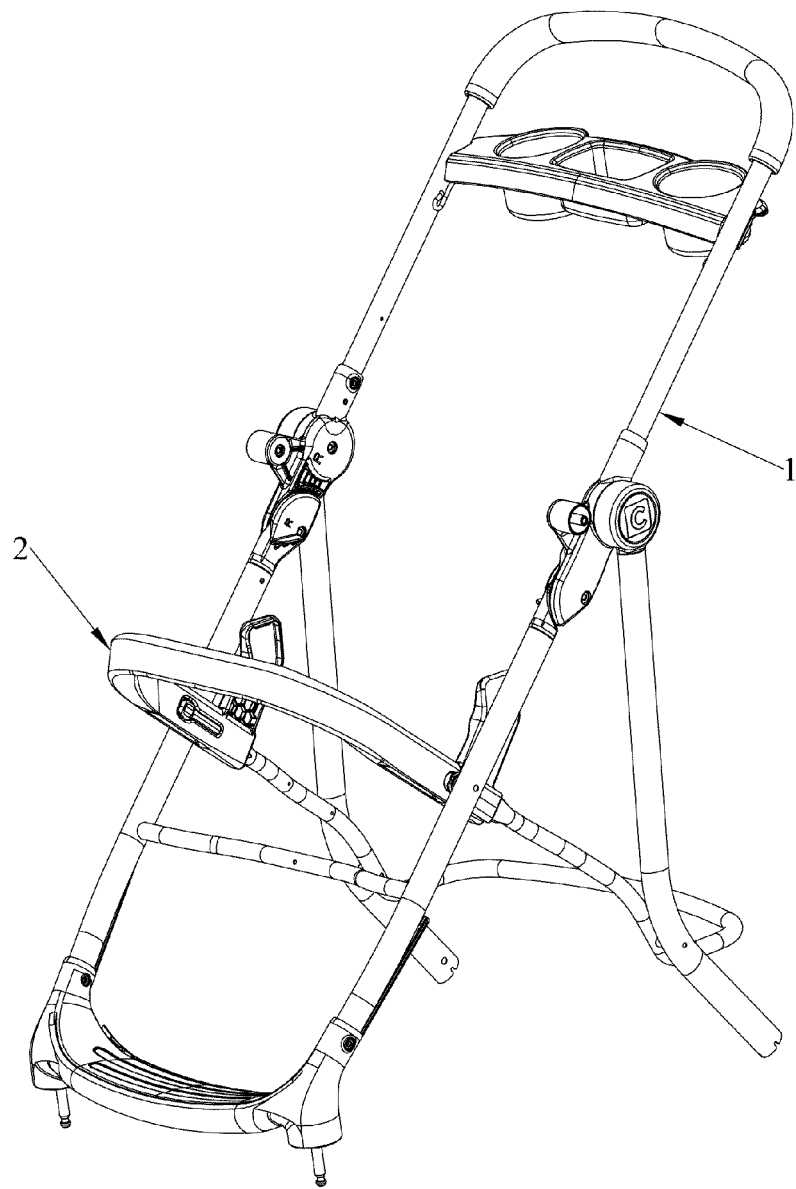
FIG. 2 is a schematic drawing of the stroller without illustration of a dinner plate according to the embodiment of the present invention.
Figure 3:
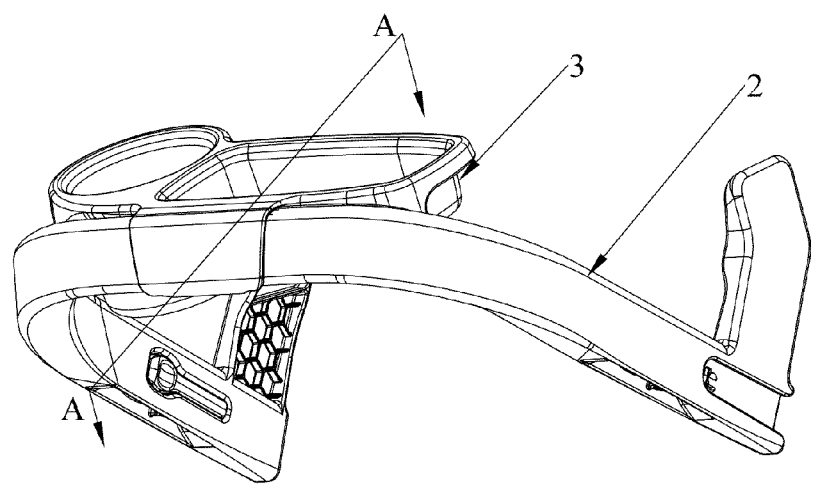
FIG. 3 is a schematic drawing illustrating connection of a handrail and the dinner plate according to the embodiment of the present invention.
Figure 4:
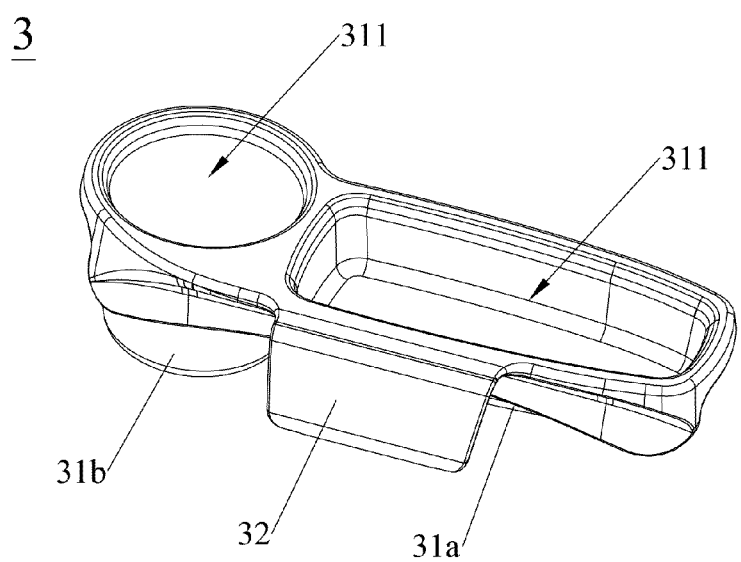
FIG. 4 and FIG. 5 are schematic drawings of the dinner plate at different views according to the embodiment of the present invention.
Figure 5:
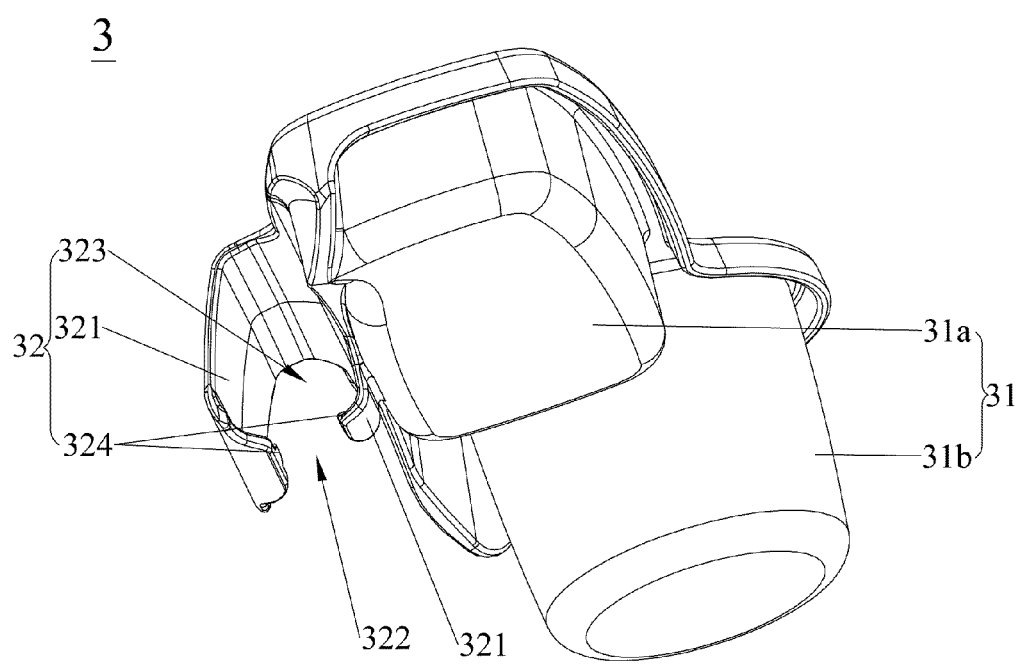

Please refer to FIG. 1 to FIG. 5. FIG. 1 is a schematic drawing of a stroller 100 according to an embodiment of the present invention. FIG. 2 is a schematic drawing of the stroller 100 without illustration of a dinner plate 3 according to the embodiment of the present invention. FIG. 3 is a schematic drawing illustrating connection of a handrail 2 and the dinner plate 3 according to the embodiment of the present invention. FIG. 4 and FIG. 5 are schematic drawings of the dinner plate 3 at different views according to the embodiment of the present invention. The stroller 100 includes a frame 1, a seat body which is not shown in figures, the handrail 2 and the dinner plate 3. The handrail 2 is installed on the frame 1 and located in front of the frame 1 and the seat body, so as to protect an infant seating on the seat body. The dinner plate 3 is detachably installed on the handrail 2. By detachable connection of the dinner plate 3 and the handrail 2, the dinner plate 3 and the handrail 2 can work together when assembling with each other, and the dinner plate 3 and the handrail 2 also can work independently when disassembling from each other. When the dinner plate 3 is installed on the handrail 2, the stroller 100 has both functions of safety and feeding convenience. When the dinner plate 3 is removed from the handrail 2, the handrail 2 is installed on the frame 1 and still can provide the protecting function, which ensures the safety of the stroller 100. Furthermore, the dinner plate 3 can be detached from the handrail 2 for cleaning, so as to reduce difficulty in cleaning the dinner plate 3, and the replaceable design of the dinner plate 3 can reduce maintenance cost effectively.

As shown in FIG. 1, the dinner plate 3 is installed on a rear side of the handrail 2 so as to make the dinner plate and the infant seating on the seat body closer, which is convenient for the infants to eat by themselves. In other embodiments, the dinner plate 3 can be installed on a front side or the front and rear sides of the handrail 2. When the dinner plate 3 is installed on the front side of the handrail 2, a distance between the dinner plate 3 and the infant is increased, so as to fit a stroller with a small seat space. The distance between the dinner plate 3 and the handrail 2 can be adjusted by means of the detachable connecting mechanism of the dinner plate 3 and the handrail 2, and is not limited thereto.

Please refer to FIG. 1 to FIG. 4, the dinner plate 3 can engage with the handrail 2 in a clamping manner, but not limited to this. Specifically, the dinner plate 3 includes a dinner plate body 31 and an engaging component 32 connected to the dinner plate body 31 and for engaging with the handrail 2. The engaging component 32 and the dinner plate body 31 can be an integral structure. Specifically, the engaging component 32 can be sleeved on the handrail 2. In other embodiments, the engaging component 32 also can be plugged into the handrail 2, and it depends on actual design requirements.

Please refer to FIG. 1 to FIG. 4, the engaging component 32 is connected to a front side of the dinner plate body 31, and the dinner plate body 31 is located behind the handrail 2. It is understandable that when the installation direction of the dinner plate 3 is changed so that the dinner plate 3 is installed in front of the handrail 2, the engaging component 32 can be designed to connect to a rear side of the dinner plate body 31. In other embodiments, the engaging component 32 also can be connected to a bottom of the dinner plate body 31, and is not limited to this.

Figure 6:
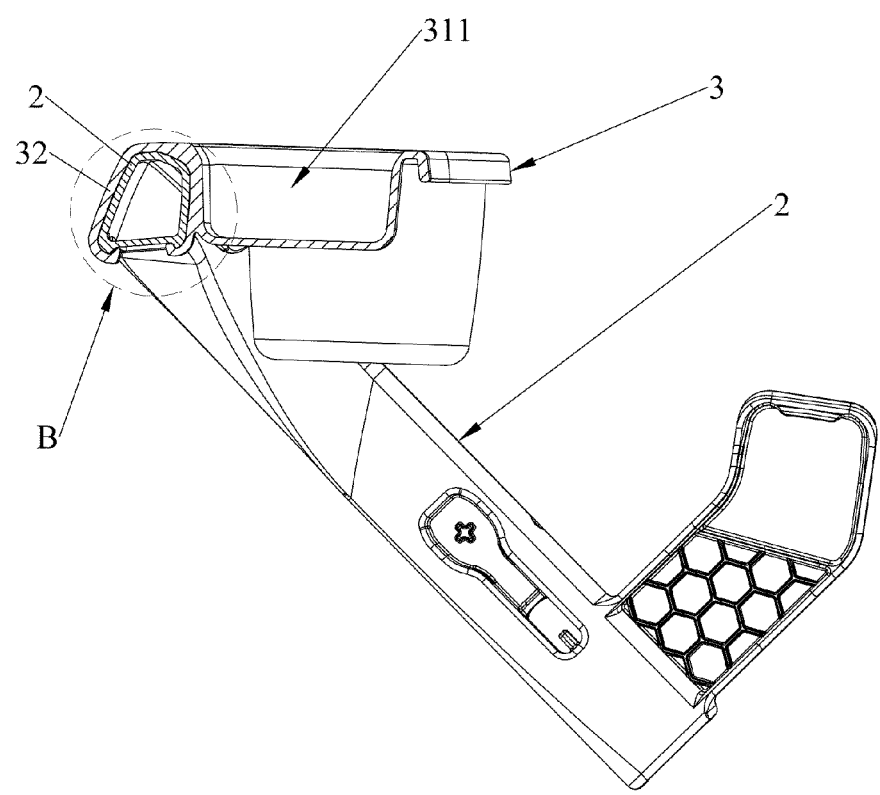
FIG. 6 is a sectional diagram taken along a line A-A of FIG. 3 according to the embodiment of the present invention.
Figure 7:
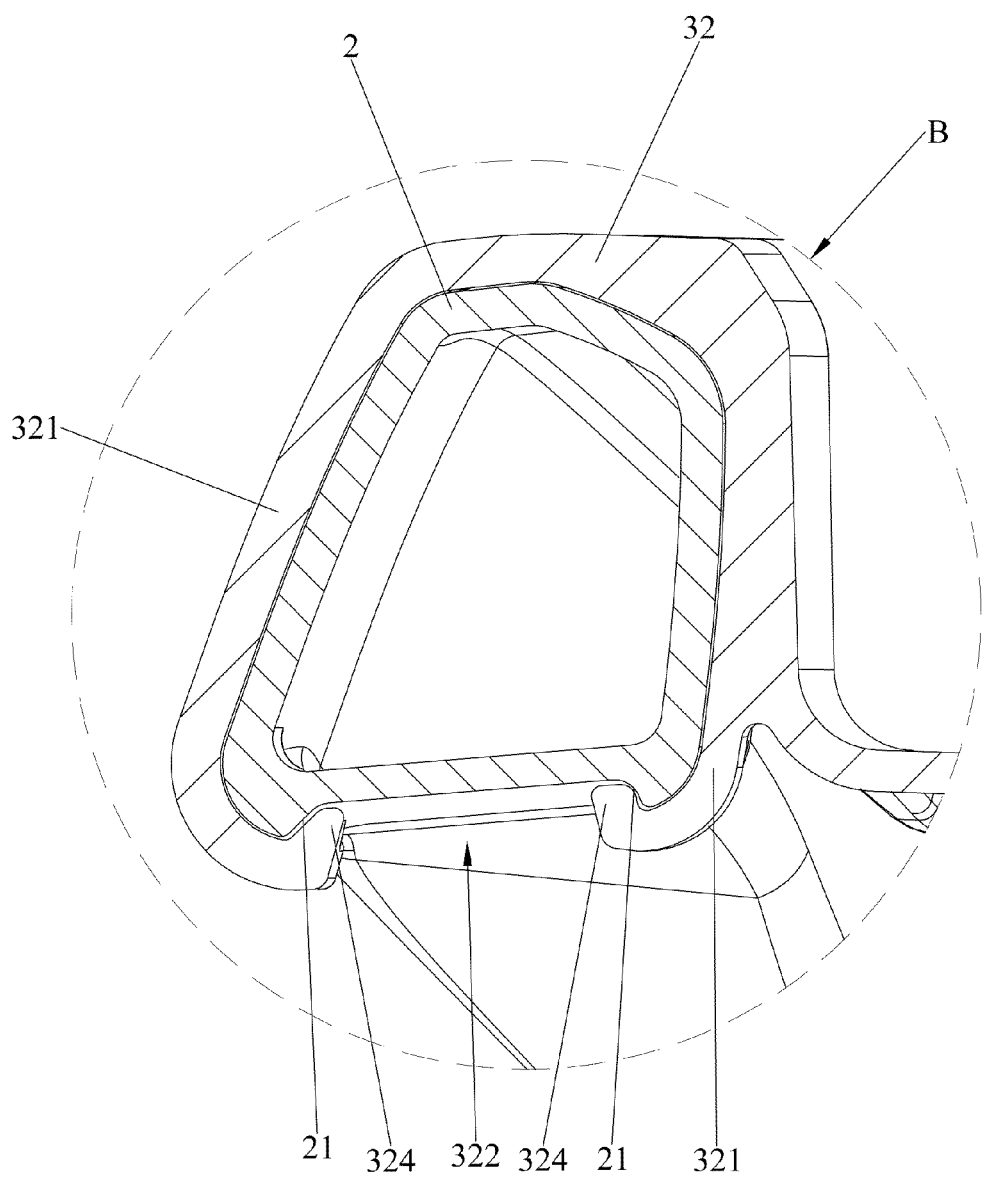
FIG. 7 is an enlarged sectional diagram showing a part B of FIG. 6 according to the embodiment of the present invention.

Please refer to FIG. 4 to FIG. 7. FIG. 6 is a sectional diagram taken along a line A-A of FIG. 3 according to the embodiment of the present invention. FIG. 7 is an enlarged sectional diagram showing a part B of FIG. 6 according to the embodiment of the present invention. The engaging component 32 can be a resilient structure for clamping the handrail 2 in a tight fit manner. That is, the engaging component 32 has a tendency to clamp the handrail 2 with a tight fit engagement. Specifically, the engaging component 32 includes two clamping arms 321 disposed opposite to each other to encircle an accommodating space 323 with a downward opening 322, and the handrail 2 can pass through the accommodating space 323. When it is desired to install the dinner plate 3 on the handrail 2, the opening 322 is oriented to face downwards and toward the handrail 2 and then the clamping arms 321 abut against two sides of the handrail 2. By exerting downward force on the engaging component 32, the two clamping arms 321 are deformed and stretched out by the resilient effect. When the handrail 2 is located in the accommodating space 323, the two clamping arms 321 clamp the handrail 2 under recovery of the resilient potential energy. For example, the two clamping arms 321 outwardly extend from a lateral wall of the dinner plate body 31 and bend downwardly. Preferably, an engaging hook 324 is disposed on a bottom of each clamping arm 321 and protrudes toward the accommodating space 323, and at least one inclined surface 21 is formed on a bottom of the handrail 2 to cooperate with the engaging hook 324. With the cooperation of the engaging hook 324 and the inclined surface 21, it benefits the fixing stability of the dinner plate 3, so as to prevent the dinner plate 3 from shaking due to excessive load, and it can make the engagement of the engaging component 32 and the handrail 2 more reliable so as to prevent the dinner plate 3 from rotating during use.

As shown in FIG. 4 and FIG. 5, the dinner plate body 31 includes a first body portion 31a and a second body portion 31b, and the first body portion 31a and the second body portion 31b can be integrally formed with each other. The first body portion 31a has a box-shaped structure, and the second body portion 31b has a barrel-shaped structure. A receiving compartment 311 with an upward opening is formed on an upper surface of each of the first body portion 31a and the second body portion 31b. The receiving compartment 311 can be a column compartment structure. In this embodiment, the receiving compartment 311 of the first body portion 31a can be a quadrangular column compartment structure, and the receiving compartment 311 of the second body portion 31b can be a cylindrical compartment structure. In other embodiments, the number of body portions of the dinner plate 3 can be determined according to actual design requirements, for example, it may be one, three, or four, and it is not limited thereto. When there is one body portion of the dinner plate 3, the receiving compartment on the upper surface of the body portion can be determined according to actual design requirements, for example, there can be one, two, or three receiving compartments, and it is not limited thereto.

In other embodiments, the engaging component can be connected to a bottom of the dinner plate. Specifically, the engaging component can be located between the first body portion and the second body portion, and the engaging component includes two opposite clamping arms. One of the clamping arms extends downwards from a lateral wall of the first body portion, and the other of the clamping arms extends downwards from a lateral wall of the second body portion. The position of the engaging component on the dinner plate body is not limited to this, and it depends on actual design requirements.

The working principle of the stroller 100 of the present invention is introduced as follows. When the stroller 100 needs to be equipped with the dinner plate 3, the dinner plate 3 can be installed on the handrail 2. When it is desired to install the dinner plate 3 on the handrail 2, the opening 322 encircled by the two clamping arms is aligned to the handrail 2, and then the dinner plate 3 is pressed down so that the two clamping arms 321 are deformed and stretched out by the resilient effect, so as to receive the handrail 2 in the accommodating space 323 for engaging the dinner plate 3 with the handrail 2. When it is desired to disassemble the dinner plate 3 from the handrail 2, the two clamping arms 321 located on two sides of the handrail 2 are pulled outwardly, so that the dinner plate 3 can separate from the handrail 2.

In contrast to the prior art, the dinner plate 3 of the stroller 100 of the present invention is detachably connected to the handrail 2, so the dinner plate 3 and the handrail 2 can work independently or together. When the dinner plate 3 and the handrail 2 are assembled with each other, the stroller 100 has both functions of safety and feeding convenience. When the dinner plate 3 is removed from the handrail 2, the handrail 2 is installed on the frame 1 and still can provide the protecting function, which ensures the safety of the stroller 100. Furthermore, the dinner plate 3 can be detached from the handrail 2 for cleaning, so as to reduce difficulty in cleaning the dinner plate 3, and the replaceable design of the dinner plate 3 can reduce maintenance cost effectively. Therefore, the stroller 100 of the present invention has advantages of simple structure, and that the handrail 2 and the dinner plate 3 can work independently.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A stroller comprising:
a frame;
a handrail installed on the frame and located in front of the frame; and
a tray detachably installed on the handrail, wherein the tray comprises a tray body and an engaging component connected to the tray body and for engaging with the handrail, the engaging component comprises two clamping arms disposed opposite to each other to encircle an accommodating space with a downward opening, the handrail passes through the accommodating space, an upwardly bent engaging hook extending upwards into a downward-facing opening of the handrail is disposed on a bottom of each clamping arm and protrudes toward the accommodating space, and two opposed inclined surfaces are formed on a bottom of the handrail to cooperate with the two upwardly bent engaging hooks.

2. The stroller of claim 1, wherein the tray is installed on at least one of a front side and a rear side of the handrail.

3. The stroller of claim 1, wherein the tray engages with the handrail in a clamping manner.

4. The stroller of claim 1, wherein the engaging component is connected to a front side, a rear side or a bottom of the tray body.

5. The stroller of claim 1, wherein the engaging component is a resilient structure for clamping the handrail in a tight fit manner.

6. The stroller of claim 1, wherein the two clamping arms outwardly extend from a lateral wall of the tray body and bend downwardly.

7. The stroller of claim 1, wherein at least one receiving compartment with an upward opening is formed on an upper surface of the tray body.

8. The stroller of claim 7, wherein the at least one receiving compartment is a column compartment structure.

9. The stroller of claim 1, wherein the tray body comprises a first body portion and a second body portion integrally formed with each other.

* * * * *